(12) United States Patent
Danyluk et al.

(10) Patent No.: US 11,042,540 B2
(45) Date of Patent: Jun. 22, 2021

(54) DETERMINING WHETHER TO TAKE AN ACTION BY APPLYING A METRIC CALCULATED USING NATURAL LANGUAGE PROCESSING TOKENS

(71) Applicant: International Business Machines Corporation, Armonk, NY (US)

(72) Inventors: Nicholas Danyluk, Poughkeepsie, NY (US); Eli M. Dow, Wappingers Falls, NY (US); Kavita Sehgal, Poughkeepsie, NY (US); Diane Stamboni, Pleasant Valley, NY (US); Sneha Varghese, Fishkill, NY (US); John Werner, Fishkill, NY (US); Sarah Wu, Kingston, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 213 days.

(21) Appl. No.: 15/701,704

(22) Filed: Sep. 12, 2017

(65) Prior Publication Data
US 2019/0079970 A1    Mar. 14, 2019

(51) Int. Cl.
*G06F 40/284* (2020.01)
*G06F 16/242* (2019.01)
(Continued)

(52) U.S. Cl.
CPC ...... *G06F 16/243* (2019.01); *G06F 16/24564* (2019.01); *G06F 16/24573* (2019.01);
(Continued)

(58) Field of Classification Search
CPC ...... G06F 40/30; G06F 40/284; G06F 16/243; G06F 16/3329; G06F 40/205;
(Continued)

(56) References Cited

U.S. PATENT DOCUMENTS

| 7,680,675 B1 | 3/2010 | Kwun et al. |
|---|---|---|
| 8,473,313 B2 | 6/2013 | Abreu |
| (Continued) | | |

FOREIGN PATENT DOCUMENTS

WO    2009014753 A2    1/2009

OTHER PUBLICATIONS

P. Tanawongsuwan, "Product review sentiment classification using parts of speech," 2010 3rd International Conference on Computer Science and Information Technology, Chengdu, 2010, pp. 424-427, doi: 10.1109/ICCSIT.2010.5563883. (Year: 2010).*

(Continued)

*Primary Examiner* — Michelle T Kringen
*Assistant Examiner* — Lance Y Cai
(74) *Attorney, Agent, or Firm* — Cantor Colburn LLP; Teddi Maranzano (57) ABSTRACT

Embodiments described herein are directed to computer-implemented methods, systems, and computer program products for calculating a metric using natural language processing tokens. A non-limiting example of the computer-implemented method includes parsing, by a processing device, user content using a natural language processing technique to extract tokens. The method further includes filtering, by the processing device, the tokens relating to a natural language processing criterion. The method further includes calculating, by the processing device, a metric based at least in part on the filtered tokens. The method further includes determining, by the processing device, whether to take an action by applying the metric to a set of rules. The method further includes taking the action responsive to determining to take the action.

8 Claims, 7 Drawing Sheets

(51) Int. Cl.
*G06Q 30/06* (2012.01)
*G06Q 30/00* (2012.01)
*G06F 16/2455* (2019.01)
*G06F 16/2457* (2019.01)
*G06F 16/33* (2019.01)
*G06F 40/30* (2020.01)
*G06F 40/205* (2020.01)
*G06Q 50/26* (2012.01)
*G06N 20/00* (2019.01)

(52) U.S. Cl.
CPC ........ *G06F 16/3344* (2019.01); *G06F 40/205* (2020.01); *G06F 40/284* (2020.01); *G06F 40/30* (2020.01); *G06Q 30/014* (2013.01); *G06Q 30/0625* (2013.01); *G06Q 30/0631* (2013.01); *G06N 20/00* (2019.01); *G06Q 50/265* (2013.01)

(58) Field of Classification Search
CPC ............... G06F 16/3344; G06F 40/289; G06F 16/24522; G06F 40/253; G06F 16/90332; G06F 40/20; G06N 20/00; G06Q 30/0631; G06Q 30/0623; G06Q 30/014
USPC .............................................. 705/26.1, 26.62
See application file for complete search history.

(56) References Cited

U.S. PATENT DOCUMENTS

| | | | |
|---|---|---|---|
| 9,189,946 B2 | 11/2015 | Sloo et al. | |
| 2007/0185751 A1* | 8/2007 | Dempers | G06Q 10/063 705/7.29 |
| 2008/0140577 A1* | 6/2008 | Rahman | G06Q 20/3829 705/71 |
| 2010/0049590 A1* | 2/2010 | Anshul | G06Q 30/02 705/7.32 |
| 2010/0268598 A1* | 10/2010 | Musgrove | G06Q 30/0253 705/14.51 |
| 2011/0093400 A1* | 4/2011 | Waite | G06Q 30/014 705/303 |
| 2013/0035983 A1 | 2/2013 | Kursar et al. | |
| 2014/0025670 A1* | 1/2014 | Daran | G06F 16/24578 707/724 |
| 2014/0172497 A1 | 6/2014 | Kim et al. | |
| 2014/0309968 A1 | 10/2014 | Diezmos et al. | |
| 2016/0112212 A1* | 4/2016 | Tabrizi | H04L 12/1822 715/756 |
| 2017/0004549 A1 | 1/2017 | Krause et al. | |
| 2017/0337570 A1* | 11/2017 | Astigarraga | G06Q 30/0202 |
| 2018/0144301 A1* | 5/2018 | Engel | G06Q 10/0837 |

OTHER PUBLICATIONS

List of IBM Patents or Patent Applications Treated as Related; Date Filed: Sep. 12, 2017, p. 1-2.

Nicholas Danyluk, et al.,"Determining Whether to Take an Action by Applying a Metric Calculated Using Natural Language Processing Tokens," U.S. Appl. No. 15/800,125, filed Nov. 1, 2017.

Ryan Sullivan, et al., "Finding Potentially Unsafe Nutritional Supplements From User Reviews With Topic Modeling", Pacific Symposium on Biocomputing, 2016, p. 1-12.

* cited by examiner

DETERMINING WHETHER TO TAKE AN ACTION BY APPLYING A METRIC CALCULATED USING NATURAL LANGUAGE PROCESSING TOKENS

BACKGROUND

The present disclosure generally relates to natural language processing, and more specifically, to using a set of rules to determine whether to take an action by applying a metric that is calculated using natural language processing tokens.

Natural language processing (NLP) enables computing devices to understand human language. NLP enables computing devices to analyze, understand, and derive meaning from human text/language. For example, a computing device equipped with NLP can receive a user question posed in natural (human) language, process the question (e.g., NLP, information retrieval, knowledge representation, automated reasoning, and machine learning), and return results to the user.

SUMMARY

Embodiments described herein are directed to computer-implemented methods, systems, and computer program products for calculating a metric using natural language processing tokens. A non-limiting example of the computer-implemented method includes parsing, by a processing device, user content using a natural language processing technique to extract tokens. The method further includes filtering, by the processing device, the tokens relating to a natural language processing criterion. The method further includes calculating, by the processing device, a metric based at least in part on the filtered tokens. The method further includes determining, by the processing device, whether to take an action by applying the metric to a set of rules. The method further includes taking the action responsive to determining to take the action.

Additional technical features and benefits are realized through the techniques of the present disclosure. Embodiments and aspects of the present disclosure are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments described herein are apparent from the following detailed description taken in conjunction with the accompanying drawings in which:

The diagrams depicted herein are illustrative. There can be many variations to the diagrams or the operations described therein without departing from the spirit of the embodiments described herein. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers.

DETAILED DESCRIPTION

Various embodiments are described herein with reference to the related drawings. Alternative embodiments can be devised without departing from the scope of this disclosure. Various connections and positional relationships (e.g., over, below, adjacent, etc.) are set forth between elements in the following description and in the drawings. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e.

two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the present disclosure may or may not be described in detail herein. In particular, various aspects of computing systems and specific computer programs to implement the various technical features described herein are well-known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
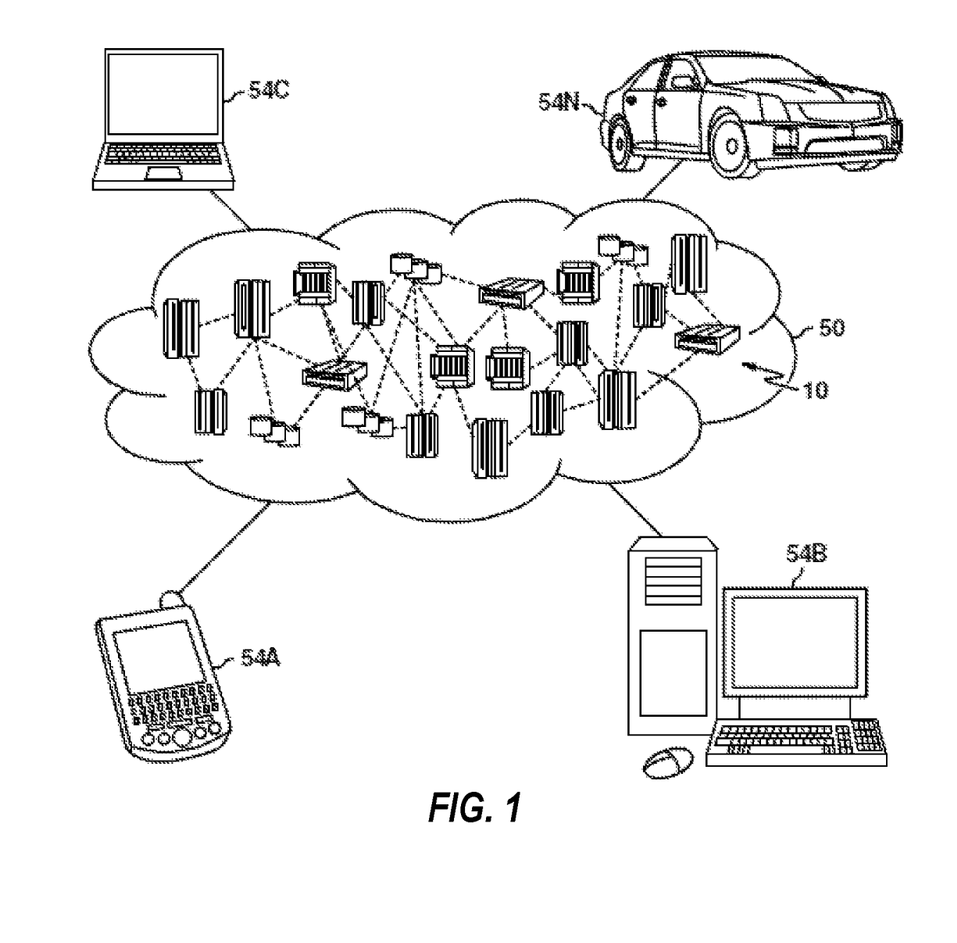
FIG. 1 depicts a cloud computing environment according to aspects of the present disclosure.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
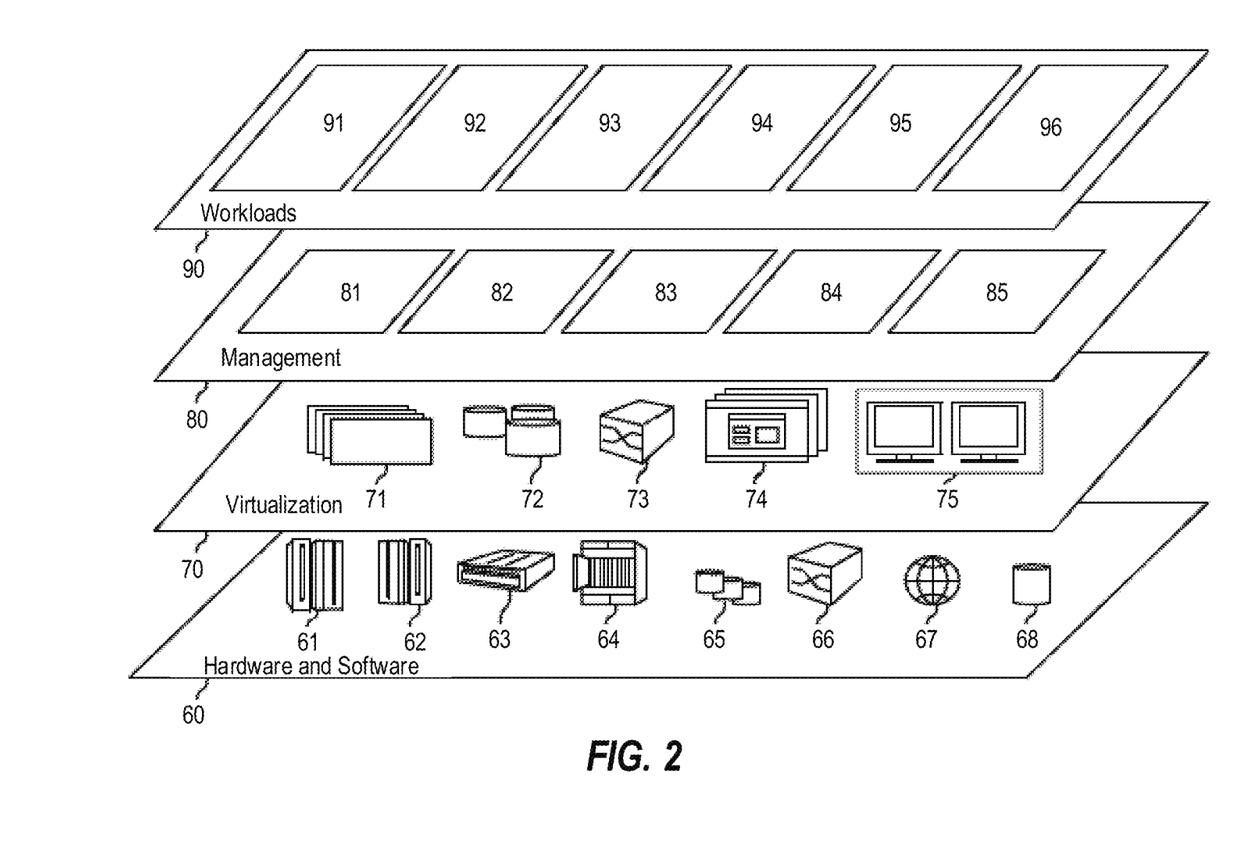
FIG. 2 depicts abstraction model layers according to aspects of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the present disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and product safety rating and notification 96.

Figure 3:
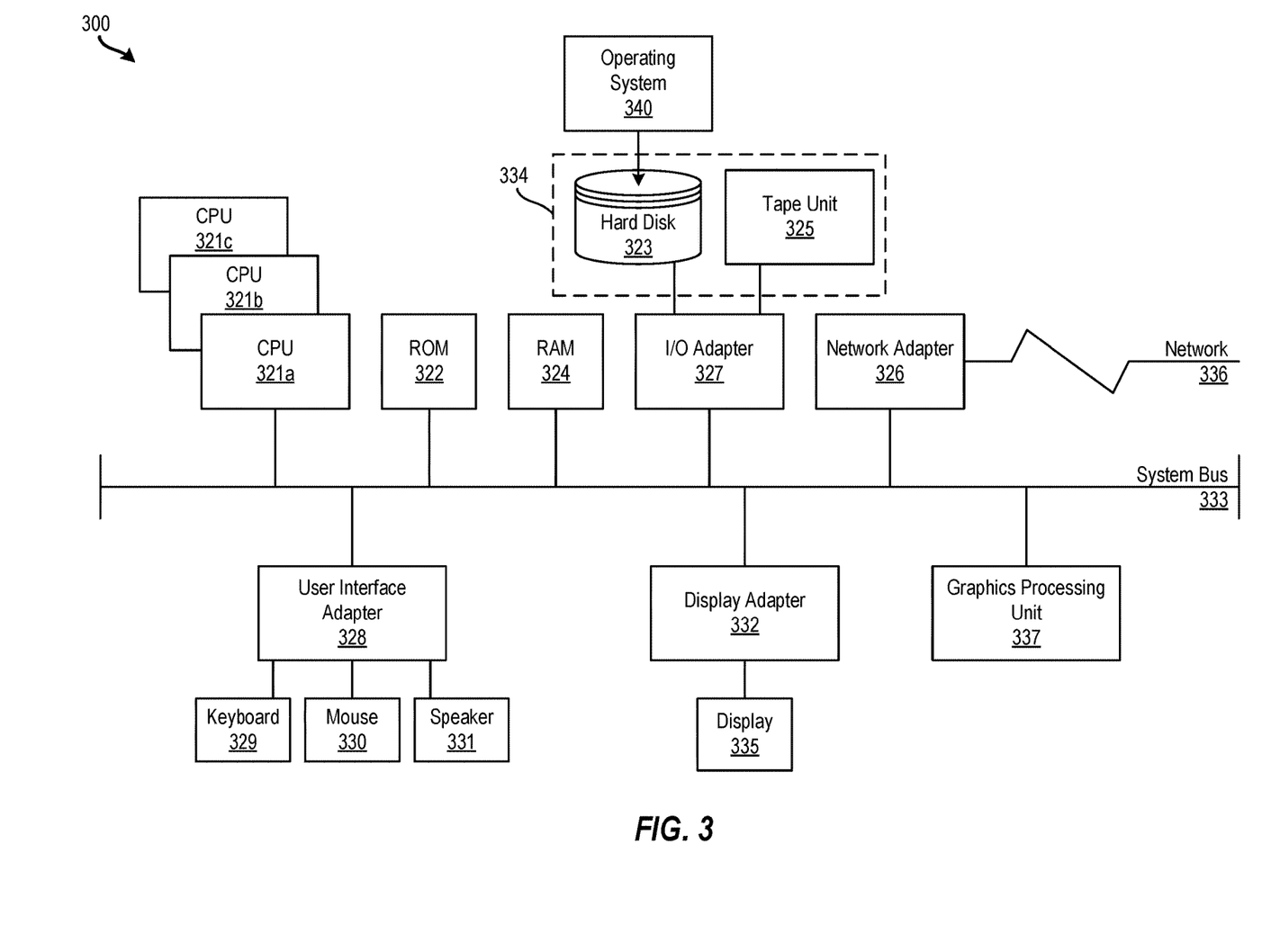
FIG. 3 depicts a processing system for implementing the techniques described herein according to aspects of the present disclosure.

It is understood that embodiments of the present disclosure are capable of being implemented in conjunction with any other suitable type of computing environment now known or later developed. For example, FIG. 3 illustrates a block diagram of a processing system 300 for implementing the techniques described herein. In examples, processing system 300 has one or more central processing units (processors) 321a, 321b, 321c, etc. (collectively or generically referred to as processor(s) 321 and/or as processing device(s)). In aspects of the present disclosure, each processor 321 may include a reduced instruction set computer (RISC) microprocessor. Processors 321 are coupled to system memory (e.g., random access memory (RAM) 324) and various other components via a system bus 333. Read only memory (ROM) 322 is coupled to system bus 333 and may include a basic input/output system (BIOS), which controls certain basic functions of processing system 300.

Further illustrated are an input/output (I/O) adapter 327 and a communications adapter 326 coupled to system bus 333. I/O adapter 327 may be a small computer system interface (SCSI) adapter that communicates with a hard disk 323 and/or a tape storage drive 325 or any other similar component. I/O adapter 327, hard disk 323, and tape storage device 325 are collectively referred to herein as mass storage 334. Operating system 40 for execution on processing system 300 may be stored in mass storage 334. A network adapter 326 interconnects system bus 333 with an outside network 336 enabling processing system 300 to communicate with other such systems.

A display (e.g., a display monitor) 335 is connected to system bus 333 by display adaptor 332, which may include a graphics adapter to improve the performance of graphics intensive applications and a video controller. In one aspect of the present disclosure, adapters 326, 327, and/or 332 may be connected to one or more I/O busses that are connected to system bus 333 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 333 via user interface adapter 328 and display adapter 332. A keyboard 329, mouse 330, and speaker 31 may be interconnected to system bus 33 via user interface adapter 328, which may include, for example, a Super I/O chip integrating multiple device adapters into a single integrated circuit.

In some aspects of the present disclosure, processing system 300 includes a graphics processing unit 337. Graphics processing unit 337 is a specialized electronic circuit designed to manipulate and alter memory to accelerate the creation of images in a frame buffer intended for output to a display. In general, graphics processing unit 337 is very efficient at manipulating computer graphics and image processing and has a highly parallel structure that makes it more effective than general-purpose CPUs for algorithms where processing of large blocks of data is done in parallel.

Thus, as configured herein, processing system 300 includes processing capability in the form of processors 321, storage capability including system memory (e.g., RAM 324), and mass storage 334, input means such as keyboard 329 and mouse 330, and output capability including speaker 331 and display 335. In some aspects of the present disclosure, a portion of system memory (e.g., RAM 324) and mass storage 334 collectively store an operating system such as the AIX® operating system from IBM Corporation to coordinate the functions of the various components shown in the processing system 300.

Turning now to an overview of technologies that are more specifically relevant to aspects of the present disclosure, the present techniques provide for using a set of rules to determine whether to take an action by applying a metric that is calculated using natural language processing tokens. For example, user content is parsed using natural language processing techniques to extract tokens. The tokens that relate to a natural language processing criterion are filtered, and a metric is calculated based on the filtered tokens. It is then determined whether to take an action by applying the metric to a set of rules.

As an example, content-based product safety ratings can be generated using natural language processing of user content. The user content can include, for example, product ratings, product reviews, social media posts about the product, video reviews, etc. Consumers can purchase or otherwise acquire products and services, such as from brick-and-mortar stores and/or online virtual stores using e-commerce systems. Various products and services can also have ratings and reviews associated therewith. These ratings and reviews can be provided, for example, by other consumers or experts and can be useful when deciding whether to make a purchase Traditionally, a seemingly innocent product can have a dangerous design flaw, quality control issue, and/or defect that can cause sickness, injury, or even fatality. For example, pet foods or pet treats may be poorly regulated and can contain quality and safety defects. Similarly, poorly designed products such as poorly designed infant seats or pool floaties have also been linked to injury and fatality.

Despite the occurrence of damage, sickness, injury, death, etc., these products are not always recalled in a timely manner. Some products could even remain on shelves or in warehouses of retailers despite a recall. Moreover, some products may not even be recalled due to insufficient evidence or a failure or unwillingness of the manufacturer to issue a recall.

Although product reviews and ratings may already exist online, it is impractical for a user to search through all these reviews to identify potential safety issues. For example, searching through many hundreds or even thousands of reviews can be time-consuming and inefficient. Moreover, some consumers do not bother researching smaller or habitual purchases. Even when research is performed, it can be difficult for a consumer to determine which reviews should be taken more seriously due to uncertainty in the expertise level of the reviewer (author).

Turning now to an overview of present techniques, one or more embodiments described herein address the above-described shortcomings of the prior art by using natural language processing techniques to parse user content to generate tokens. The tokens can then be used to calculate a metric, to which a set of rules can be applied to determine whether to take an action. These techniques can be applied to identify safety issues with a product of interest. In particular, the present techniques parse user content such as reviews, articles, social media posts, videos, etc., for a product of interest to identify information related to product safety of the product of interest. The user content is generally provided by other consumers (referred to as "authors") who have purchased or used the particular product. Using results of the parsing, a metric (e.g., a product safety score) is calculated, and specific portions of the user content related to product safety (e.g., text describing a product defect) can be stored and made available to a user (e.g., a potential purchaser). The metric can be applied to a set of rules to determine whether to take an action, and the action (e.g., issuing a recall, suggesting a similar product, etc.) can be taken.

In addition, a reputation factor can be computed for the authors of the user content. For example, a review authored by a "verified expert" (e.g., a doctor, a veterinarian, etc.) can be weighted higher than a review by a non-verified expert. As another example, reviewers that have written a high number of reviews with positive reaction can also receive favorable reputation factor scores and can be weighted higher than users who have not written a higher number of reviews. The reputation factor can aid a consumer in determining whether a review is trustworthy.

To access the safety information, a consumer can search for a product (e.g., by name, by photograph, by barcode, by model number, etc.). In addition, a database of products that a consumer owns/uses can be maintained, and the user can be notified if any of the products in the database experience an increase in product safety score (such as above a threshold).

Figure 4:
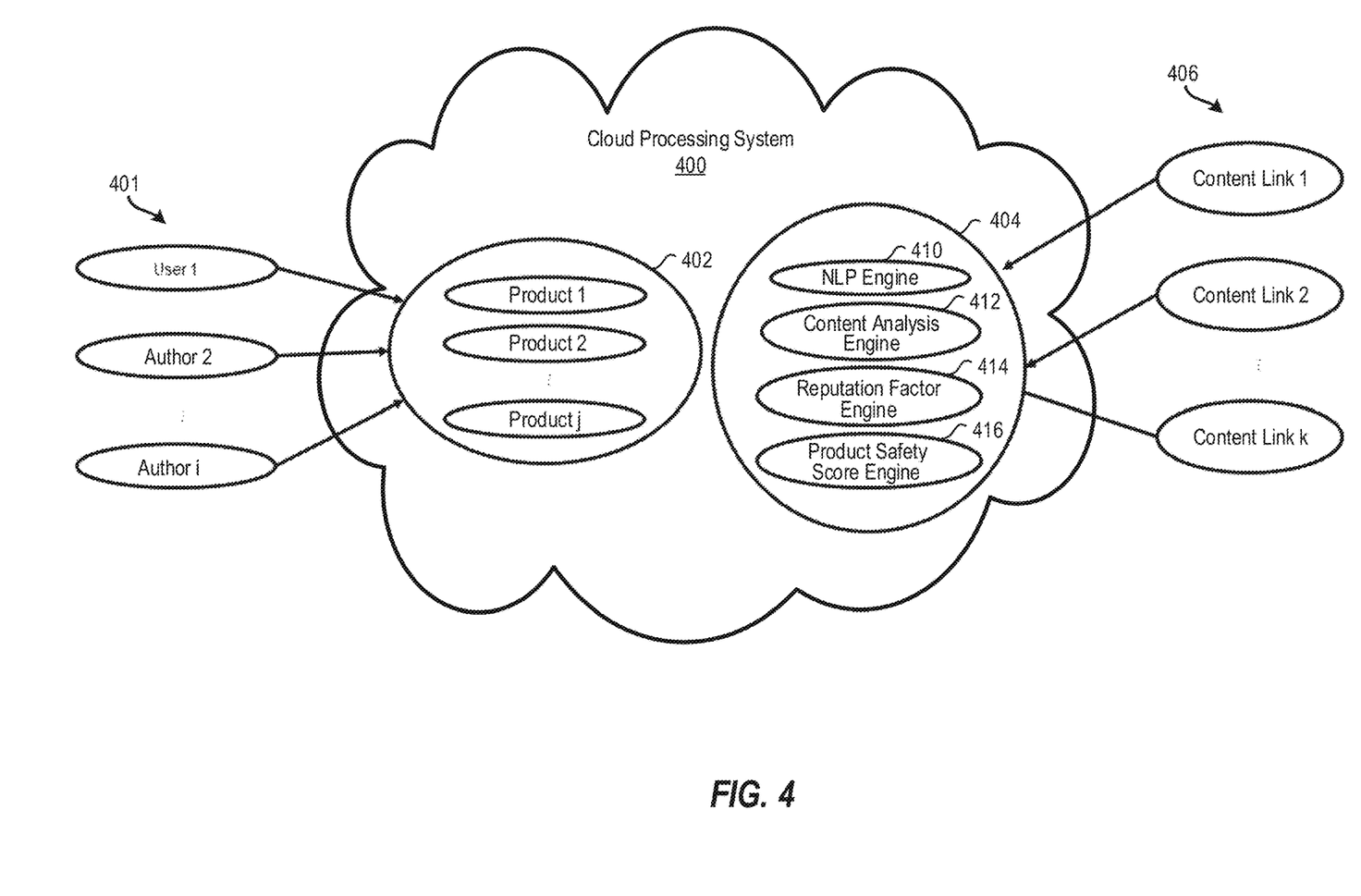
FIG. 4 depicts a block diagram of a cloud processing system for using a set of rules to determine whether to take an action by applying a metric that is calculated using natural language processing tokens according to aspects of the present disclosure.

Turning now to a more detailed description of aspects of the present disclosure, FIG. 4 depicts a block diagram of a cloud processing system 400 for using a set of rules to determine whether to take an action by applying a metric that is calculated using natural language processing tokens according to aspects of the present disclosure. The cloud processing system 400 can be implemented in the cloud computing environment 50, for example.

The cloud processing system 400 includes a data store 402 that stores content (e.g., content about products) that is received from authors 401 (e.g., Author 1, Author 2, Author i, etc.). In some examples, the content can be retrieved from other data stores (e.g., product reviews stored on e-commerce platforms, posts stored on social media platforms, etc.). The content 406 can be written product reviews, video product reviews, verbal product reviews, product forums, social media posts, and the like. The data store 402 can be continuously updated by authors, by web crawlers searching for new content, etc.

The cloud processing system 400 also includes an analysis module 404 that can be used to find and parse the content to search for and extract product information, such as information relating to product safety. The analysis module 404 includes an NLP engine 410, a content analysis engine 412, a reputation factor engine 414, and a product safety score engine 416.

The NLP engine 410 can include various application programming interfaces (APIs) to find and parse user content relating to products and extract product safety information, for example, from the user content. The following are examples of some APIs that can be implemented in the NLP engine 410: an AlchemyLanguage API to use NLP and machine learning algorithms to analyze text; a Natural Language Classifier API to use machine learning algorithms to return matching predefined classes for short text inputs; a Personality Insights API to use linguistic analytics to infer individuals' intrinsic personality characteristics to derive insights from social media posts, enterprise data, or other digital communications; a Tone Analyzer API to use linguistic analysis to detect types of tones from written text, such as emotions (e.g., anger, cheerfulness, sadness, etc.), social tendencies, and language style; a Speech to Text API to transcribe speech from various languages and audio formats to text with low latency; a Visual Recognition API to use deep learning algorithms to identify scenes, objects, and faces in images; an AlchemyData News API to use natural language processing techniques to query news and blogs; and/or a Tradeoff Analytics API to help make decisions when faced with a decision problem that includes multiple goals and alternatives (e.g., to explore trade-offs between options to make complex decisions).

Using these APIs, the NLP engine 410 parses the content in the data store to search for information relating to a product of interest, for example. When product information is found, the content analysis engine 412 analyzes the content about the product of interest based on tone, context, credibility, etc. using the APIs. For example, content is analyzed by searching for tokens related to product safety (e.g., positive safety information and negative safety information). Tokens such as "sick," "injure," "pain," "disease," "concussion," etc., may be considered by the content analysis engine 412 to be negative safety information, for example. Further text processing is then performed by the content analysis engine 412 to understand the context of the identified token to determine whether the reviewed product is causing negative symptoms (e.g., "unsafe for children" or "caused vomiting" are considered negative safety information") or contains positive safety information (e.g., "reduces pain" or "make the user feel less nauseous" are considered positive safety information even though they contain words like "pain" and "nauseous"). Tokens such as "secure," "safe," "reinforced," "stable," etc. may be considered by the content analysis engine 412 to be positive safety information. Further text processing is performed to understand the context of the identified token to ensure that the reviewed product is the reason for the positive sentiment. Content that is analyzed that contains no safety information (either positive or negative) can be discarded (e.g., content that discusses how a product works, shipping information for the product, etc.).

Based on the analysis by the content analysis engine 412, a product safety metric (or "score") can be calculated by the product safety score engine 416. The metric can be based, for example, on a number of negative safety information occurrences versus a number of positive safety information occurrences. In another example, the metric can be based on a number of negative safety information occurrences versus a number of total reviews. For example, two negative safety information occurrences for 1,500 reviews may receive a relatively high safety metric (indicating a relatively safe product) while nine negative safety information occurrences for 30 reviews may receive a relatively low safety metric (indicating a potentially unsafe product). The metric can be numerical in nature (e.g., a number on a scale of 1 to 10, a percentage of negative safety information, etc.) or categorical (e.g., low/medium/high, safe/unsafe, etc.). In yet another example, the severity of the review may also be considered. For example, a product review that indicates a fatality could weigh more heavily than another review that indicates a minor injury.

The product safety score engine 416 can refine the metric using a reputation factor determined by the reputation factor engine 414. For example, the reputation factor engine 414 can take into account a reputation of the author of the content. A user that has hundreds of positive reviews may indicate a high reputation factor score, and content from this user may increase a products' safety metric. Favorability of a user's content can be judged based on how helpful the user's reviews are judged to be. For example, many review sites enable voting on reviews to indicate whether the review is helpful or unhelpful. If the user has multiple reviews in a certain product category (e.g., over the counter drugs) that are consistently favorable, the user's reputation in that product group may be higher than the user's reputation in another product group.

In another example, a recognized (verified) expert may have a higher reputation factor score, and content from this user may also increase a products' safety metric if the content relates to the user's expertise. For example, a veterinarian may be considered an expert on pet food, a doctor may be considered an expert on over the counter drugs, etc. Expert advice towards a product, whether positive or negative, is given a higher weight in deciding safety ratings of a product of interest. An expert can be verified, for example, by providing a copy of their license or degree, etc.

The reputation factor engine 414 calculates a reputation factor for each author based on the factors listed above. The reputation factor can be multiplied by the product safety metric calculated by the product safety score engine 416 to form a final product safety score. As the reputation of the user increases, the final product safety score can change accordingly (i.e., increase or decrease). The final product safety score can be used to initiate an action (e.g., suggest a similar, safer product, issue a product recall, send a warning to users about the product of interest, etc.).

According to aspects of the present disclosure, a database of a user's purchased products can be maintained. The present techniques can be used to search for content relating to safety for the user's purchased products, and the user can be warned if new content is published that would indicate negative safety information, for example.

Figure 5:
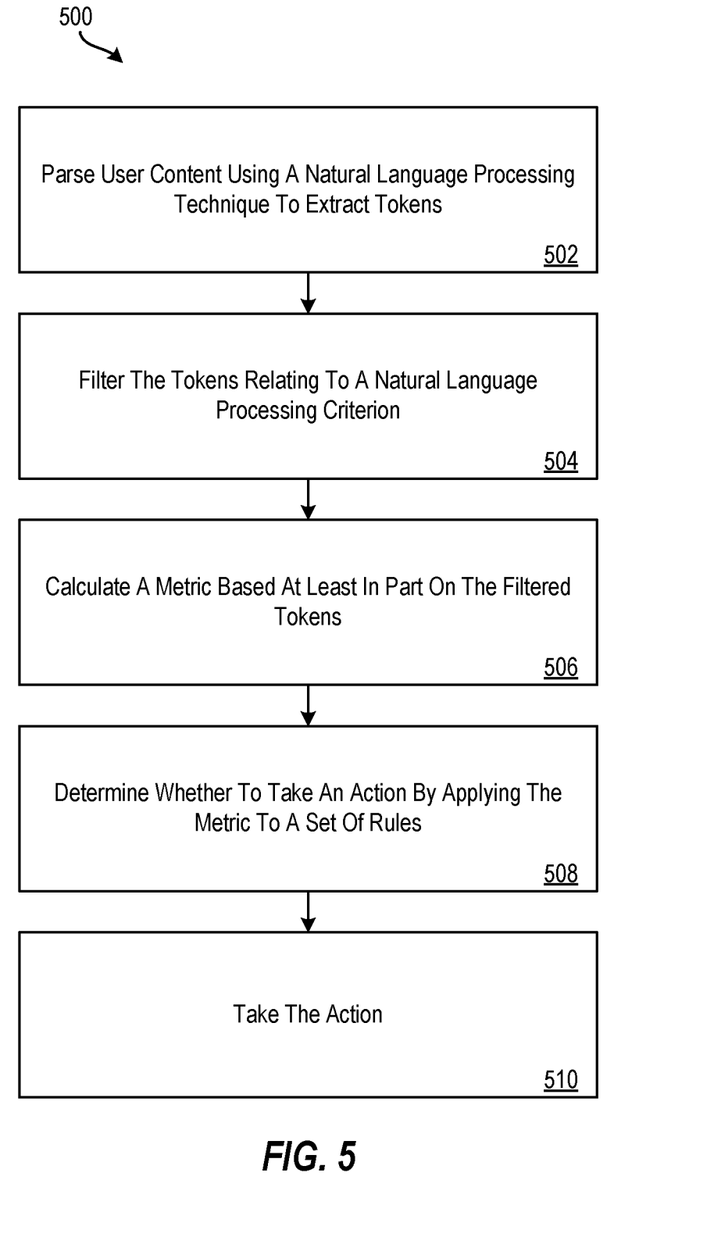
FIG. 5 depicts a flow diagram of a method for using a set of rules to determine whether to take an action by applying a metric that is calculated using natural language processing tokens according to aspects of the present disclosure.

FIG. 5 depicts a flow diagram of a method 500 for using a set of rules to determine whether to take an action by applying a metric that is calculated using natural language processing tokens according to aspects of the present disclosure. The method 500 can be performed by any suitable processing device or system, such as the processing system 300 of FIG. 3 or the cloud processing system 400 of FIG. 4.

At block 502, the analysis module 404 of the processing device parses user content using a natural language processing technique to extract tokens. According to an example of the present disclosure, the user content can relate to a product of interest. The user content can be in the form of product reviews, product ratings, social media posts, published articles, television and radio content, and the like.

At block 504, the analysis module 404 of the processing device filters the tokens relating to a natural language processing criterion. For example, in the case of the user content relating to a product of interest, the tokens can be filtered using an NLP criterion relating to product safety (e.g., injuries, sickness, fatalities, etc.) for the product of interest. In the case of the user content relating to a product of interest, the content can be parsed to extract tokens that relate to product safety (e.g., injuries, sickness, fatalities, etc.) for the product of interest.

At block 506, the analysis module 404 of the processing device calculates a metric based at least in part on the filtered tokens. In the product safety example, the metric (or "score") is a safety metric and can be calculated based on safety-related tokens appearing in the content. For example, a product of interest with many reviews that include tokens relating to poor product safety may result in a lower product safety score. In additional examples, the metric can be updated based on a reputation factor of an author of the content, as described herein.

At block 508, the analysis module 404 of the processing device determines whether to take an action by applying the metric to a set of rules. According to aspects of the present disclosure, the set of rules can use thresholds to determine whether to take an action. For example, if a product safety score is lower than a first threshold, a different product that is similar may be recommended to the user. In another example, if the product safety score is lower than a second threshold, a product recall may be needed.

At block 510, an action can be taken when it is determined to take an action. For example, the action can include initiating a product recall for a product of interest, recommending a different product similar to the product of interest, or another suitable action.

Additional processes also may be included, and it should be understood that the processes depicted in FIG. 5 represent illustrations and that other processes may be added or existing processes may be removed, modified, or rearranged without departing from the scope and spirit of the present disclosure.

Figure 6:
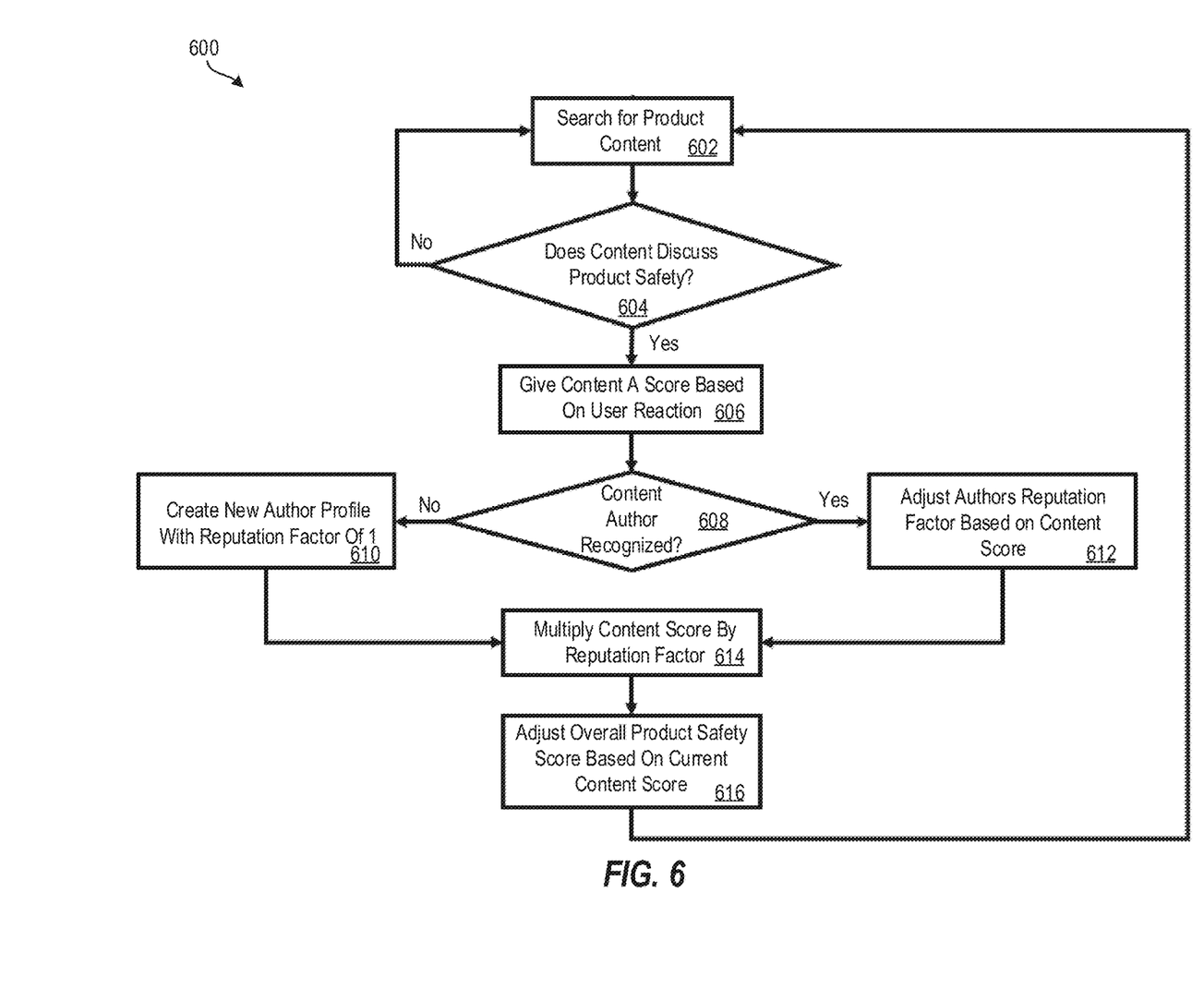
FIG. 6 depicts a flow diagram of a method for using a set of rules to determine whether to take an action by applying a metric that is calculated using natural language processing tokens according to aspects of the present disclosure.

FIG. 6 depicts a flow diagram of a method 600 for using a set of rules to determine whether to take an action by applying a metric that is calculated using natural language processing tokens according to aspects of the present disclosure. The method 500 can be performed by any suitable processing device or system, such as the processing system 300 of FIG. 3 or the cloud processing system 400 of FIG. 4.

At block 602, the analysis module 404 of the processing device searches for product content (e.g., user content about a product of interest), such as in the data store 402. At decision block 604, the analysis module 404 determines whether the product content discusses product safety. If not, the method 600 returns to search for additional product content at block 602. However, if at decision block 604 it is determined that the content discusses product safety for the product of interest, a product safety score is calculated at block 606 for the product of interest. The safety score can be based, for example, on a user's reaction to the product content (e.g., the severity of an injury).

At decision block 608, it is determined whether the product content for the product of interest is authored by a recognized author. Recognized authors can be habitual reviewers, recognized experts (e.g., a doctor), or another trusted source. If at decision block 608 it is determined that the author is not recognized, a new author profile is created at block 610, and the author's profile is assigned a baseline reputation factor (e.g., a reputation factor of "1"). If, however, at decision block 608 it is determined that the author is recognized, the author's profile can be updated based on how helpful/useful the content is at block 612.

At block 614, the content score for the content is multiplied by the author's reputation factor to generate a safety score. In this way, content generated by recognized authors can be weighted either positively or negatively depending on the author (e.g., a medical expert may have a higher reputation factor, an author known for writing fake reviews may have a lower reputation factor). At block 616, an overall product safety score is updated based on the safety score.

Additional processes also may be included, and it should be understood that the processes depicted in FIG. 6 represent illustrations and that other processes may be added or existing processes may be removed, modified, or rearranged without departing from the scope and spirit of the present disclosure.

Figure 7:
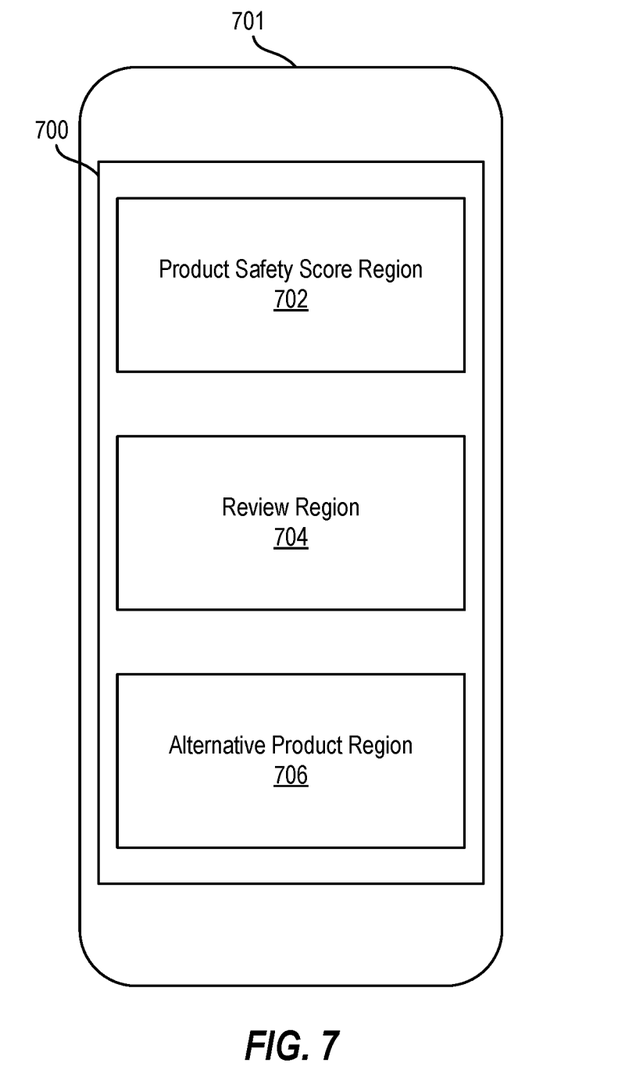
FIG. 7 depicts a graphical user interface for displaying product safety information according to aspects of the present disclosure.

FIG. 7 depicts a graphical user interface (GUI) 700 for displaying product safety information according to aspects of the present disclosure. The GUI 700 can be displayed on a display of a processing device 701 or system such as the display 335 of the processing system 300. According to the example of FIG. 7, the GUI 700 includes a product safety score region 702 to present a product safety score to a user. The GUI 700 also includes a review region 704 to present review information, such as portions (i.e., snippets) of reviews that support the product safety score. The GUI 700 can also include an alternative product region 706 to present alternative products that can be selected and presented based on their respective product safety scores. For example, a functionally similar product with a higher product safety score may be presented as one alternative, while a less expensive product with a higher product safety score may be presented as another alternative.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed:

1. A system comprising:
    a memory comprising computer readable instructions; and
    a processing device for executing the computer readable instructions for performing a method, the method comprising:
        parsing, by the processing device, user content using a natural language processing technique to extract tokens;
        filtering, by the processing device, the tokens relating to a natural language processing criterion relating to product safety for a product of interest;
        determining, by the processing device, a severity for the user content, the severity being based on an incident associated with the product of interest, the incident being indicated in the user content;
        simultaneously performing in parallel, by the processing device:
            calculating a safety metric for the product of interest based at least in part on the filtered tokens and based at least in part on the severity; and
            calculating a reputation factor for an author of the user content based at least in part on a determination of whether the author is a verified expert;
        recalculating, by the processing device, the safety metric by multiplying the safety metric and the reputation factor for the author of the user content to generate an updated metric;
        determining, by the processing device, whether to take an action by applying the updated metric to a set of rules; and
        taking the action responsive to determining to take the action.

2. The system of claim 1, wherein the user content relates to the product of interest.

3. The system of claim 2, wherein the action comprises initiating a product recall for the product of interest.

4. The system of claim 2, wherein the action comprises recommending a different product similar to the product of interest.

5. The system of claim 4, wherein the safety metric is a first safety metric, wherein the first safety metric is associated with the product of interest, and wherein a second safety metric is associated with the different product.

6. The system of claim 5, wherein the second safety metric is greater than the first safety metric.

7. The system of claim 1, wherein the set of rules utilizes a plurality of thresholds to determine whether to take the action.

8. A computer program product comprising:
    a computer readable storage medium having program instructions embodied therewith, wherein the computer readable storage medium is not a transitory signal per se, the program instructions executable by a processing device to cause the processing device to perform operations comprising:
        parsing, by the processing device, user content using a natural language processing technique to extract tokens;
        filtering, by the processing device, the tokens relating to a natural language processing criterion relating to product safety for a product of interest;

determining, by the processing device, a severity for the user content, the severity being based on an incident associated with the product of interest, the incident being indicated in the user content;

simultaneously performing in parallel, by the processing device:
  calculating a safety metric for the product of interest based at least in part on the filtered tokens and based at least in part on the severity; and
  calculating a reputation factor for an author of the user content based at least in part on a determination of whether the author is a verified expert; and recalculating, by the processing device, the safety metric by multiplying the safety metric and the reputation factor for the author of the user content to generate an updated metric;

determining, by the processing device, whether to take an action by applying the updated metric to a set of rules; and taking the action responsive to determining to take the action.

* * * * *